United States Patent
Govindillam K et al.

(10) Patent No.: US 10,297,162 B2
(45) Date of Patent: May 21, 2019

(54) SYSTEM AND METHOD TO ACTIVATE AVIONICS FUNCTIONS REMOTELY

(71) Applicant: Honeywell International Inc., Morris Plains, NJ (US)

(72) Inventors: Sreenivasan Govindillam K, Bengaluru (IN); Nathan K, Bangalore (IN); Sujith Kalarickal, Kozhikode District (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 15/392,128

(22) Filed: Dec. 28, 2016

(65) Prior Publication Data

US 2018/0182252 A1 Jun. 28, 2018

(51) Int. Cl.
| | |
|---|---|
| *H04W 12/00* | (2009.01) |
| *G08G 5/00* | (2006.01) |
| *G06Q 20/10* | (2012.01) |
| *G06Q 30/04* | (2012.01) |
| *H04W 12/02* | (2009.01) |
| *H04L 9/08* | (2006.01) |
| *B64D 43/00* | (2006.01) |
| *G06F 16/23* | (2019.01) |
| *G07C 5/00* | (2006.01) |

(52) U.S. Cl.
CPC .......... *G08G 5/0095* (2013.01); *B64D 43/00* (2013.01); *G06F 16/2379* (2019.01); *G06Q 20/102* (2013.01); *G06Q 30/04* (2013.01); *G07C 5/008* (2013.01); *H04L 9/0866* (2013.01); *H04W 12/02* (2013.01); *H04L 2209/80* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 6,067,486 A | * | 5/2000 | Aragones | B64F 5/60 |
| | | | | 701/29.6 |
| 6,519,552 B1 | * | 2/2003 | Sampath | G05B 23/0254 |
| | | | | 702/183 |

(Continued)

FOREIGN PATENT DOCUMENTS

EP  3 093 725 A1  11/2016

OTHER PUBLICATIONS

Pope, "Cockpit and cabin avionics", "http://www.ainoline.com/aviation-news/2007-10-17/cockpit-and-cabin-avionics", Oct. 17, 2007, pp. 1-15.

(Continued)

*Primary Examiner* — Jonathan M Dager
(74) *Attorney, Agent, or Firm* — Bookoff McAndrews, PLLC

(57) ABSTRACT

In one embodiment, a vehicle is provided. The vehicle comprises a vehicle control system, at least one vehicle control coupled to the vehicle control system, a vehicle communications system coupled to the vehicle control system, wherein the vehicle control system is configured to enable one or more vehicle functions upon receipt of a function enablement key provided through the vehicle communications system from an operations center, and wherein the vehicle control system is configured to transmit confirmation data from the vehicle to the operations center.

20 Claims, 7 Drawing Sheets

(56) References Cited

U.S. PATENT DOCUMENTS

| | | | | |
|---|---|---|---|---|
| 6,885,921 B1* | 4/2005 | Farmer | ............... | G06Q 10/06 701/29.1 |
| 7,099,752 B1 | 8/2006 | Lenell et al. | | |
| 7,761,200 B2* | 7/2010 | Avery | ............... | G06Q 10/06 701/29.3 |
| 7,761,201 B2* | 7/2010 | Avery | ............... | G07C 5/085 701/29.3 |
| 7,822,985 B2* | 10/2010 | Anstey | ............... | H04L 63/10 713/176 |
| 7,835,734 B2* | 11/2010 | Eckert | ............... | H04L 67/12 455/431 |
| 7,984,146 B2* | 7/2011 | Rozak | ............... | G06Q 10/06 709/225 |
| 8,082,277 B1* | 12/2011 | O'Brien | ............... | G06Q 10/101 707/758 |
| 8,185,609 B2* | 5/2012 | Fuchs | ............... | G06F 8/61 709/218 |
| 8,195,535 B2* | 6/2012 | Nagalla | ............... | G06Q 10/06 705/29 |
| 8,271,709 B2* | 9/2012 | Rittmueller | ............... | G06F 13/4295 710/106 |
| 8,341,413 B2* | 12/2012 | Belmonte | ............... | H04L 63/123 705/67 |
| 8,589,020 B1* | 11/2013 | Angus | ............... | G06F 11/3006 701/29.1 |
| 8,640,228 B2* | 1/2014 | Croize | ............... | G06F 21/34 726/20 |
| 8,732,233 B2* | 5/2014 | Allen | ............... | G08G 5/0021 701/14 |
| 8,806,579 B1* | 8/2014 | Angus | ............... | G06F 21/6218 701/29.1 |
| 8,812,284 B2* | 8/2014 | Damiani | ............... | G06F 8/30 703/13 |
| 8,825,276 B2* | 9/2014 | Lake | ............... | G07C 5/0808 701/31.6 |
| 8,849,690 B1* | 9/2014 | Yang | ............... | G06Q 10/063116 705/7.22 |
| 8,880,278 B2* | 11/2014 | Ric | ............... | H04L 67/12 701/31.4 |
| 8,930,068 B1* | 1/2015 | Helder | ............... | B64F 5/40 701/32.2 |
| 9,336,248 B2* | 5/2016 | Li | ............... | G06F 16/215 |
| 9,507,982 B2* | 11/2016 | Mylaraswamy | ............... | H04W 4/80 |
| 2001/0032110 A1* | 10/2001 | Sinex | ............... | G06Q 10/025 701/29.4 |
| 2002/0165647 A1* | 11/2002 | Glenn, III | ............... | G06F 9/451 701/3 |
| 2003/0003872 A1* | 1/2003 | Brinkley | ............... | G06F 8/61 455/66.1 |
| 2003/0071743 A1 | 4/2003 | Seah et al. | | |
| 2003/0109973 A1* | 6/2003 | Hensey | ............... | H04L 63/0853 701/32.6 |
| 2003/0201365 A1 | 10/2003 | Nelson | | |
| 2005/0055239 A1* | 3/2005 | Farmer | ............... | G06Q 10/06 705/7.11 |
| 2005/0240555 A1* | 10/2005 | Wilde | ............... | G06F 17/2247 |
| 2006/0164261 A1* | 7/2006 | Stiffler | ............... | H04L 67/12 340/945 |
| 2006/0229772 A1* | 10/2006 | McClary | ............... | G06F 8/64 701/3 |
| 2007/0010923 A1* | 1/2007 | Rouyre | ............... | G05B 23/0267 701/31.4 |
| 2007/0112486 A1* | 5/2007 | Avery | ............... | G06Q 10/06 701/33.4 |
| 2007/0112576 A1* | 5/2007 | Avery | ............... | G06Q 10/06393 705/7.39 |
| 2008/0005617 A1* | 1/2008 | Maggiore | ............... | G07C 5/006 714/30 |
| 2008/0046962 A1* | 2/2008 | Yukawa | ............... | H04L 63/08 726/1 |
| 2008/0159158 A1* | 7/2008 | Poisson | ............... | G06Q 10/06 370/249 |
| 2009/0006169 A1* | 1/2009 | Wetzer | ............... | G06Q 10/0631 705/7.14 |
| 2009/0112569 A1* | 4/2009 | Angus | ............... | H04L 67/12 703/22 |
| 2009/0119657 A1* | 5/2009 | Link, II | ............... | G06F 8/64 717/171 |
| 2009/0132111 A1* | 5/2009 | Macchia | ............... | G06Q 10/06 701/31.4 |
| 2009/0138517 A1* | 5/2009 | McLain | ............... | G06F 21/51 |
| 2009/0138871 A1* | 5/2009 | Kimberly | ............... | G06F 8/61 717/173 |
| 2009/0138874 A1* | 5/2009 | Beck | ............... | G06F 8/61 717/173 |
| 2009/0150022 A1* | 6/2009 | McMillin | ............... | G06Q 10/06 701/33.4 |
| 2009/0157532 A1* | 6/2009 | Shiner | ............... | G06Q 10/087 705/28 |
| 2009/0187449 A1* | 7/2009 | van Tulder | ............... | G06Q 10/06 705/7.17 |
| 2009/0192659 A1* | 7/2009 | Beebe | ............... | G06F 11/0739 701/2 |
| 2009/0198392 A1* | 8/2009 | Eicke | ............... | G01C 23/005 701/3 |
| 2009/0198393 A1* | 8/2009 | Sims, III | ............... | G06F 8/61 701/3 |
| 2009/0243854 A1* | 10/2009 | Scheid | ............... | G06Q 10/06 340/572.1 |
| 2009/0254403 A1* | 10/2009 | Nagalla | ............... | G06Q 10/06 705/7.38 |
| 2009/0265357 A1* | 10/2009 | Yukawa | ............... | G06F 16/00 |
| 2009/0265393 A1* | 10/2009 | Yukawa | ............... | G06F 16/27 |
| 2010/0063754 A1* | 3/2010 | Thomas | ............... | G01R 31/086 702/59 |
| 2010/0100887 A1* | 4/2010 | Beltrand | ............... | G06F 11/1438 718/104 |
| 2010/0121520 A1* | 5/2010 | Yukawa | ............... | G06F 11/0739 701/31.4 |
| 2010/0121938 A1* | 5/2010 | Saugnac | ............... | G07C 5/008 709/218 |
| 2010/0125379 A1* | 5/2010 | Fournier | ............... | G06Q 10/06 701/3 |
| 2010/0131149 A1* | 5/2010 | Saugnac | ............... | G07C 5/008 701/31.4 |
| 2010/0211358 A1* | 8/2010 | Kesler | ............... | G07C 9/00111 702/184 |
| 2010/0312420 A1* | 12/2010 | Sham | ............... | G06Q 10/00 701/3 |
| 2011/0040442 A1* | 2/2011 | Koepping | ............... | G07C 5/0808 701/31.4 |
| 2011/0202924 A1* | 8/2011 | Banguero | ............... | G06F 9/485 718/103 |
| 2011/0288759 A1* | 11/2011 | Saugnac | ............... | G06Q 10/06 701/120 |
| 2013/0031543 A1* | 1/2013 | Angus | ............... | G06F 9/45558 718/1 |
| 2013/0036103 A1* | 2/2013 | Lawson | ............... | G06F 21/64 707/698 |
| 2013/0067450 A1* | 3/2013 | Saugnac | ............... | G06F 8/65 717/170 |
| 2013/0166458 A1* | 6/2013 | Wallner | ............... | G06Q 10/20 705/305 |
| 2013/0198358 A1* | 8/2013 | Taylor | ............... | H04L 41/0213 709/223 |
| 2013/0204469 A1* | 8/2013 | Horsager | ............... | G01F 9/008 701/3 |
| 2013/0304307 A1* | 11/2013 | Safa-Bakhsh | ............... | G07C 5/006 701/31.4 |
| 2013/0305391 A1* | 11/2013 | Haukom | ............... | G06F 21/84 726/29 |
| 2014/0039733 A1 | 2/2014 | Ren et al. | | |
| 2014/0067694 A1* | 3/2014 | Moos | ............... | G06Q 10/20 705/305 |
| 2014/0122023 A1* | 5/2014 | Dewangan | ............... | G06Q 10/06 702/182 |
| 2014/0258257 A1* | 9/2014 | Schowalter | ............... | G06F 16/24 707/705 |

(56) References Cited

U.S. PATENT DOCUMENTS

| | | | | |
|---|---|---|---|---|
| 2014/0337616 A1* | 11/2014 | Kimberly | ................ | G06F 21/57 713/156 |
| 2014/0337630 A1* | 11/2014 | Kimberly | ................ | G06F 21/57 713/176 |
| 2015/0019862 A1* | 1/2015 | Uczekaj | ................ | H04L 67/12 713/155 |
| 2015/0269787 A1* | 9/2015 | Kumar | ................ | G07C 5/00 701/29.1 |
| 2015/0269790 A1* | 9/2015 | Batcheller | ................ | G08G 1/20 701/537 |
| 2015/0356319 A1* | 12/2015 | Kimberly | ................ | G06F 21/64 726/1 |
| 2016/0071331 A1* | 3/2016 | Angus | ................ | G07C 5/0808 701/29.1 |
| 2016/0075443 A1* | 3/2016 | Schmutz | ................ | G08G 5/0013 701/14 |
| 2016/0086389 A1* | 3/2016 | Mylaraswamy | ....... | G07C 5/006 704/257 |

OTHER PUBLICATIONS

Extended European Search Report dated May 4, 2018 in European Application No. 17207174.8 (8 pages).

* cited by examiner

Vehicle Database 212

| Vehicle Control System Serial Number 402 | | | |
|---|---|---|---|
| Function 1 ID 404a | Unlocking Key 1 406a | Time 1 408a | Enable 1 401a |
| Function 2 ID 404b | Unlocking Key 2 406b | Time 2 408b | Enable 2 401b |
| 404 | 406 | 408 | 401 |
| ... | ... | ... | ... |

Function 1 — 410
Function 2 — 412

FIG. 4

SYSTEM AND METHOD TO ACTIVATE AVIONICS FUNCTIONS REMOTELY

BACKGROUND

Modern aircraft avionics systems offer a sophisticated and expansive suite of control, monitoring, and processing functions which can be used during aircraft flight. The control, monitoring, and processing functions can be uniquely specified in a system configuration module (or 'aircraft personality module') that is part of the aircraft avionics system. Thus, avionics system manufacturers can manufacture a single system but customize an enabled subset of the available features through programming the system configuration module. If the control, monitoring, and processing functions are to be changed (e.g. enabled or disabled), the system configuration module has to be either replaced or reprogrammed during aircraft maintenance. However, it is desirable to modify which functions are available at other times, e.g. during aircraft operation.

SUMMARY

In one embodiment, a vehicle is provided. The vehicle comprises a vehicle control system, at least one vehicle control coupled to the vehicle control system, a vehicle communications system coupled to the vehicle control system, wherein the vehicle control system is configured to enable one or more vehicle functions upon receipt of a function enablement key provided through the vehicle communications system from an operations center, and wherein the vehicle control system is configured to transmit confirmation data from the vehicle to the operations center.

DRAWINGS

Understanding that the drawings depict only exemplary embodiments and are not therefore to be considered limiting in scope, the exemplary embodiments will be described with additional specificity and detail through the use of the accompanying drawings, in which:

FIG. 4 illustrates an exemplary vehicle database;

In accordance with common practice, the various described features are not drawn to scale but are drawn to emphasize specific features relevant to the exemplary embodiments. Reference characters denote like elements throughout figures and text.

DETAILED DESCRIPTION

Figure 1:
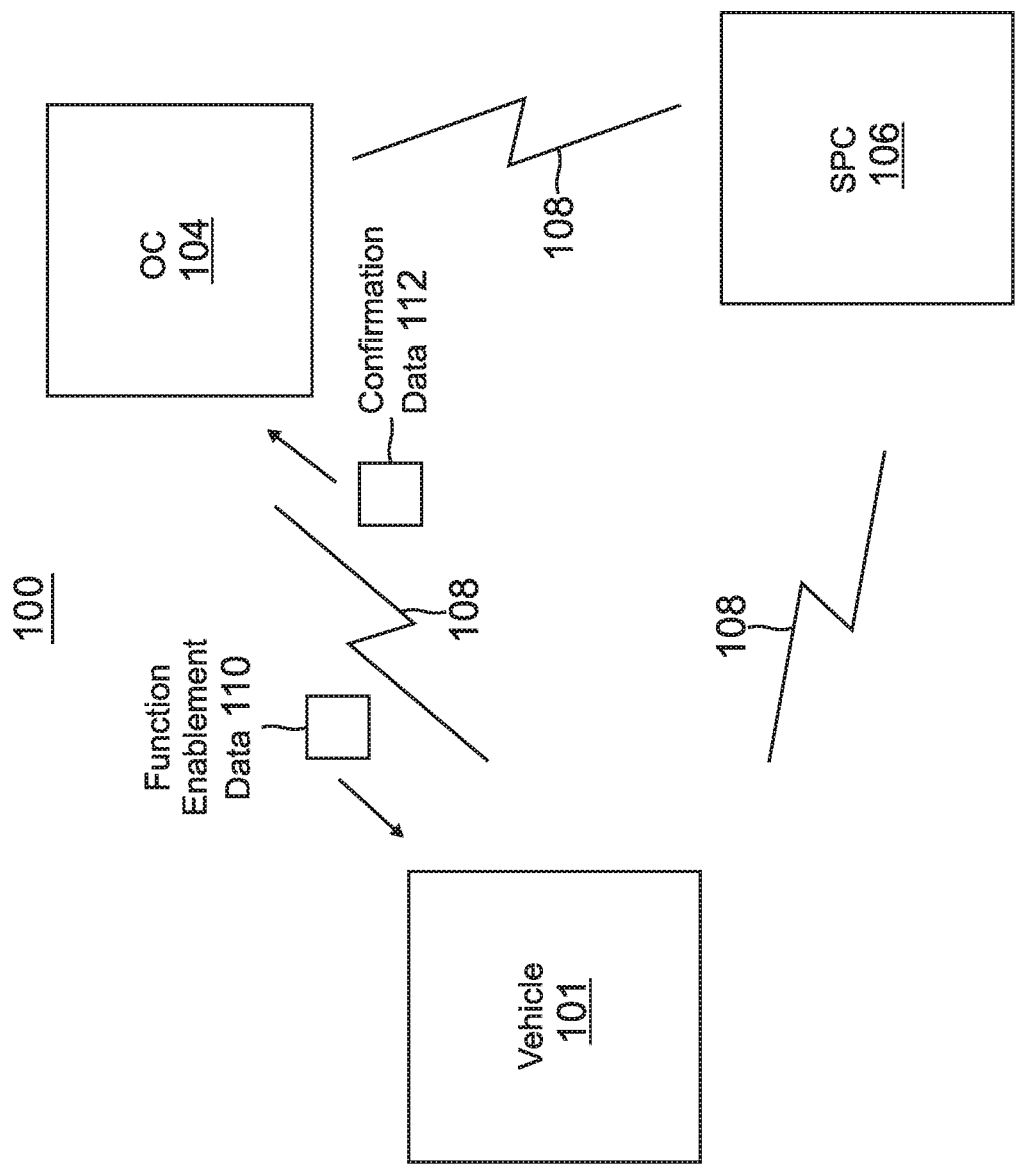
FIG. 1 illustrates a block diagram of an exemplary communications network.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

A communications network coupled to an aircraft's processing system, e.g. flight computer, may be used to overcome the above referenced problems. The embodiments of such a communications network have at least two advantages. The network permits enablement and disablement of control, monitoring, and processing functions in real time without having to physically access the system configuration module. In one embodiment, control of enablement and disablement of such functions is located in an aircraft's processing system (further described below), such as a flight computer. Although the embodiments described below generally pertain to enabling function(s), they can also be used to disable function(s).

Further, such functions can be enabled when needed for finite periods of time. As a result, the avionics system manufacturers can reduce the initial system cost, and charge for functions on a subscription basis only when the functions are enabled, activated and/or used. As a result, aircraft system operators can more readily afford feature rich avionics equipment which would improve their aircrafts' efficiency and safety. Although the present invention is exemplified as being used in an aircraft, it is envisioned that it can be used in other vehicles including without limitation automobiles, buses and trains.

FIG. 1 is a block diagram of one embodiment of a communications network 100 that includes a vehicle 101, an operations center (OC) 104, and a service provider center (SPC) 106. In another embodiment, the vehicle 101, operations center 104, and the service provider center 106 are interconnected by communication links 108. The operations center 104 and the service provider center 106 may each be alternatively referred to as a remote center. In a further embodiment, the operations center 104 or service provider center 106 remotely enables a function in the vehicle 101 regardless of whether the request for enablement originates from the vehicle 101.

In yet another embodiment, the communication links 108 coupling the vehicle 101 respectively to the operations center 104 and the service provider center 106 include wireless and/or wired networks. A wireless network permits communication to a moving or stationary vehicle 101 when a wired connection is impractical. Such wireless communication networks may be formed, for example, by HF or VHF radio, cellular, satellite networks, and/or by other appropriate wireless communication networks. In a further embodiment, the operations center 104 and the service provider center 106 may be connected by a communications link 108 including wireless and/or wired networks. An example of a wired network is the Internet, although other wired networks such as dedicated T-carrier lines can be used.

In one embodiment, as will be further described below, the operations center 104 or service provider center 106 can transmit function enablement data (or enablement data) 110 to the vehicle 101. The function enablement data 110 may also be referred to as a function enablement key. Such function enablement data 110 facilitates remotely enabling function(s) in the vehicle 101. In one embodiment, the function enablement data may only enable one corresponding function. In another embodiment, the function data 110 may enable more than one function. In another embodiment, such function enablement data 110 can be encrypted so that it is encrypted function enablement data (or encrypted enablement data). In a further embodiment, such encrypted function enablement data can be decrypted becoming decrypted function enablement data (or decrypted enablement data). In yet another embodiment, as will be further described below, the vehicle 101 transmits confirmation data 112 to the operations center 104 or service provider center 106.

Figure 2:
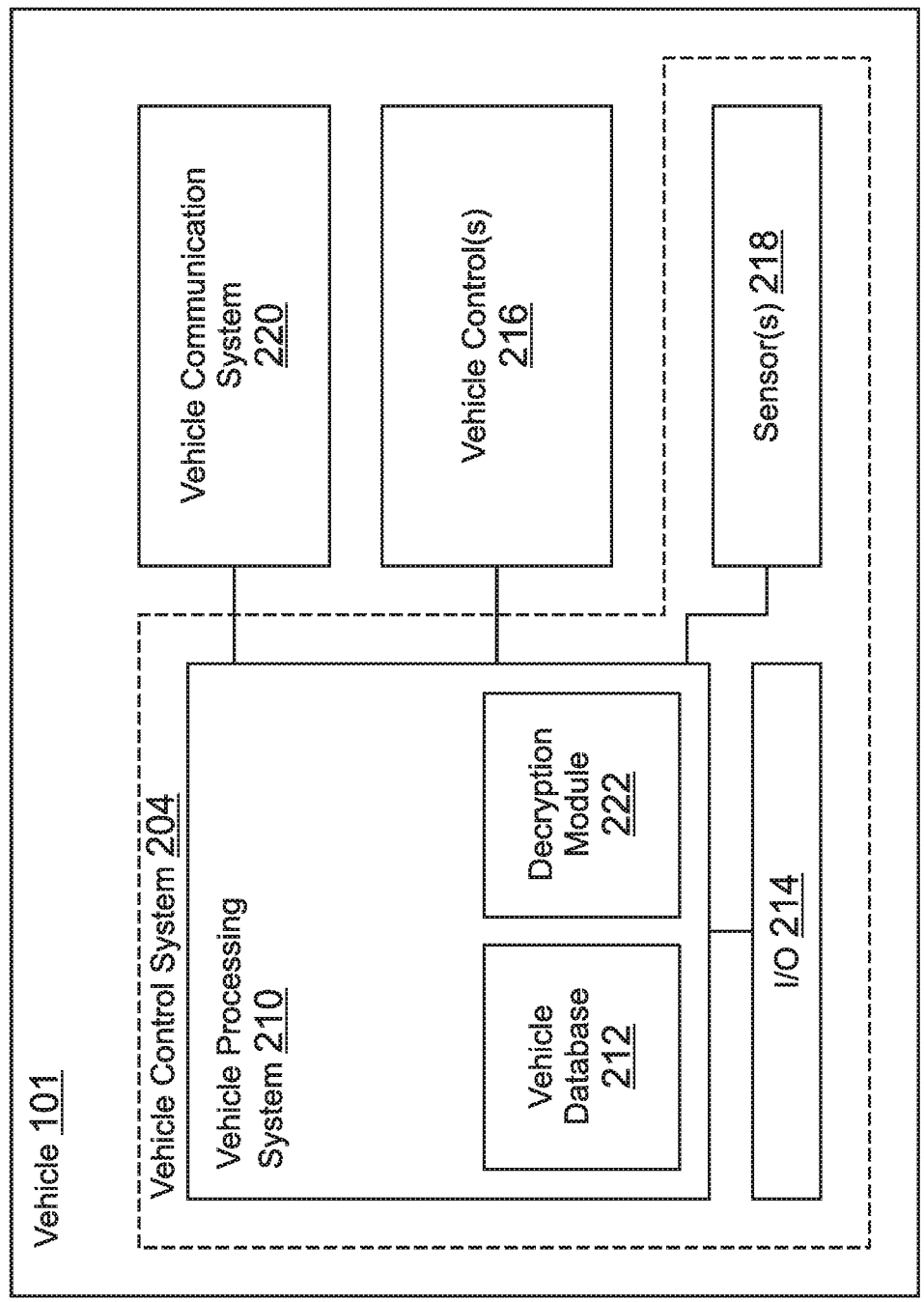
FIG. 2 illustrates a block diagram of an exemplary vehicle.

FIG. 2 illustrates one embodiment of the vehicle 101 which includes a vehicle control system 204, vehicle control(s) 216, and a vehicle communications system 220. The vehicle control(s) 216 are coupled to the vehicle control system 204, and control, e.g., the vector velocity of the vehicle 202. For example, for an aircraft, the vehicle control(s) 216 could include brakes, control surfaces (e.g. a rudder, ailerons, and flaps), propulsion systems (e.g. jet or propeller engines), and other appropriate vehicle controls.

The vehicle communications system 220 is coupled to the vehicle control system 204, and is used to transmit and receive data, e.g., respectively to and from the operations center 104, the service provider center 106, or other vehicles. In one embodiment, the vehicle communications system 220 is one or more wireless communication systems such as HF, VHF, satellite communication, cellular radio transceivers, and/or other appropriate communication systems. In a further embodiment, function enablement data 110 is provided, through the vehicle communications system 220, to the vehicle control system 204, e.g. the vehicle processing system 210, to permit one or more vehicle functions to be remotely enabled.

In another embodiment, the vehicle control system 204 includes a vehicle processing system 210, input-output interface(s) (I/O) 214, and sensor(s) 218. In a further embodiment, each of the I/O 214, vehicle control(s) 216, and sensor(s) 218 are coupled to the vehicle processing system 210. In a further embodiment, the vehicle communications system 220 is coupled to the vehicle processing system 210. In yet another embodiment, when the vehicle 101 is an aircraft, the vehicle processing system 210 may be a flight computer.

The I/O 214 facilitates control of the vehicle 101 by operator(s) of the vehicle 101. For example, for an aircraft, the I/O 214 would include rudder, aileron, flap, throttle, and other controls operated by a pilot. In yet another embodiment, the vehicle processing system 210 can automatically manipulate the vehicle control(s) 216 based upon input from the sensor(s) 218.

The sensor(s) 218 provide environmental information including altitude, airspeed, location and temperature. For example, for an aircraft, the sensor(s) 218 may include a radar altimeter, an aneroid barometer, a pitot tube, a GPS system, a temperature sensor, and other appropriate sensors.

In one embodiment, the vehicle processing system 210 includes a vehicle database 212 which includes a list of functions which can be remotely enabled and disabled. The vehicle database 212 will be subsequently described in more detail. In another embodiment, the vehicle processing system 210 includes a decryption module 222. In a further embodiment, the decryption module 222 can be implemented in software, hardware, or a combination thereof. In yet a further embodiment, to enable a function, the vehicle processing system 210 modifies the vehicle database 212, e.g. in a manner further describe below.

Figure 3:
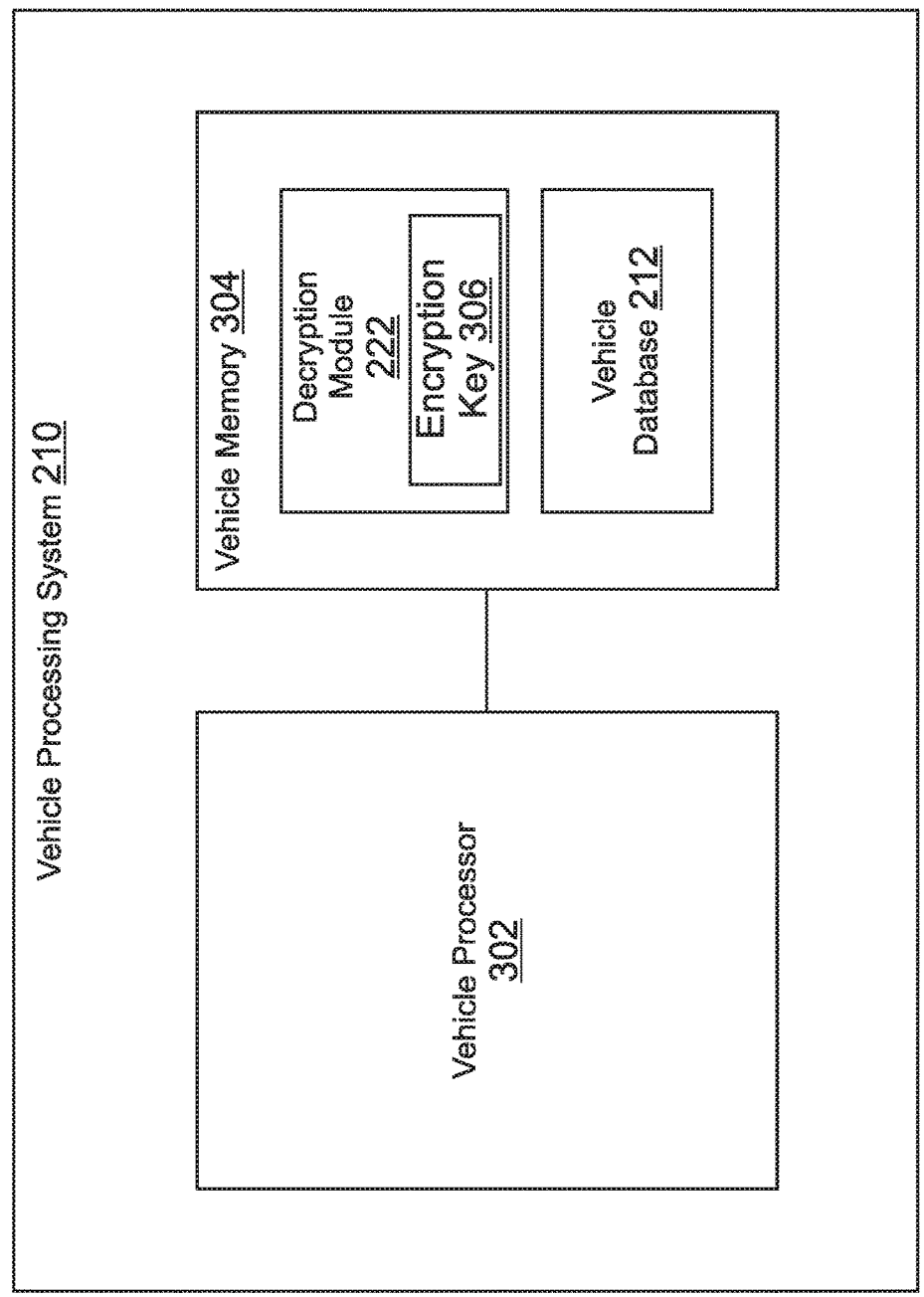
FIG. 3 illustrates a block diagram of an exemplary vehicle processing system.

FIG. 3 illustrates an exemplary vehicle processing system 210. The processing system 210 includes a vehicle processor 302 coupled to a vehicle memory 304. In one embodiment, the vehicle database 212, including initial parameters stored in fields and/or sub-fields, is stored in the memory 304, e.g. prior to vehicle 101 use. In another embodiment, the processor 302 manipulates data, in the vehicle database 212 and received from the operations center 104 and/or service provider center 106, to evaluate which functions to enable or disable.

In one embodiment, the decryption module 222 includes a decryption key which is identical to an encryption key 306 at the operations center 104 and/or service provider center 106. In a further embodiment, the decryption module 222 is used to decrypt function enablement data 110 transmitted from the operations center 104 and/or service provider center 106, as will be further described below.

In one embodiment, the decryption module 222 can be software stored in the vehicle memory 304. In other embodiments, the decryption module 222 can be located in the vehicle processor 302 or elsewhere in the processing system 210. In yet a further embodiment, the vehicle database 212 may be encrypted, e.g., using the same encryption key as used in the decryption module 222. In another embodiment, the vehicle database 212 may reside in the decryption module 222.

FIG. 4 illustrates the vehicle database 212. In the illustrated embodiment, the vehicle database 300 includes a field for a serial number, e.g. the serial number for the vehicle control system 204, i.e. vehicle control system serial number 402. In this embodiment, the vehicle database 212 has fields corresponding to different functions, e.g. function 1 410, function 2 412, etc. One example of a function is a time of arrival function which calculates vector velocities, and corresponding time periods for such vector velocities, to facilitate reaching a particular destination at a particular time. Another example of a function is a weather avoidance function which calculates vector velocities, and corresponding time periods for such vector velocities, to facilitate bypassing a region of bad weather such as turbulence.

Each function field has sub-fields, e.g., for a function identifier (function ID) 404, function unlocking key 406, unlocking time 408, identifying whether the field is enabled or disabled (Enable) 401, and possibly for other parameters. Function 1 ID 404a and function 2 ID 404b sub-fields are function IDs sub-fields respectively for function 1 410 and function 2 412. In one embodiment, each function would have a unique code, e.g. alphanumeric designator, corresponding to the function. Such code would be stored in the corresponding function ID sub-field.

Unlocking key 1 406a and unlocking key 2 406b sub-fields are unlocking key sub-fields, respectively for function 1 410 and function 2 412. In one embodiment, an unlocking key 406 stored in a sub-field is a unique key for the corresponding function and is stored in the corresponding unlocking key sub-field for that function. In another embodiment, the unlocking key 406 is generated by an encryption algorithm based upon the vehicle control system serial number 402, the function ID, and possibly other data. In a further embodiment, the unlocking key 406 is generated by an encryption algorithm using the encryption key 306; however, in alternative embodiments, other encryption keys may be used. In one embodiment, the unlocking key 406 is used to enable a corresponding function as illustrated below.

Time 1 408a and time 2 408b sub-fields are unlocking time sub-fields respectively for function 1 410 and function 2 412. In one embodiment, the time parameters govern how long the corresponding function will be enabled. The time that a function is enabled can be used for billing purposes for a subscription model as is further discussed below. A time parameter may indicate that the corresponding function is enabled, i.e. turned on or off, perpetually, enabled for a finite period of time (e.g. enabled for a finite period of time after the function is enabled, activated or use commences), or enabled until initial performance of the function is complete.

Enable 1 401*a* and Enable 2 401*b* sub-fields are Enable time sub-fields respectively for function 1 410 and function 2 412. In one embodiment, an Enable parameter identifies whether the corresponding function is enabled or disabled.

Figure 5A:
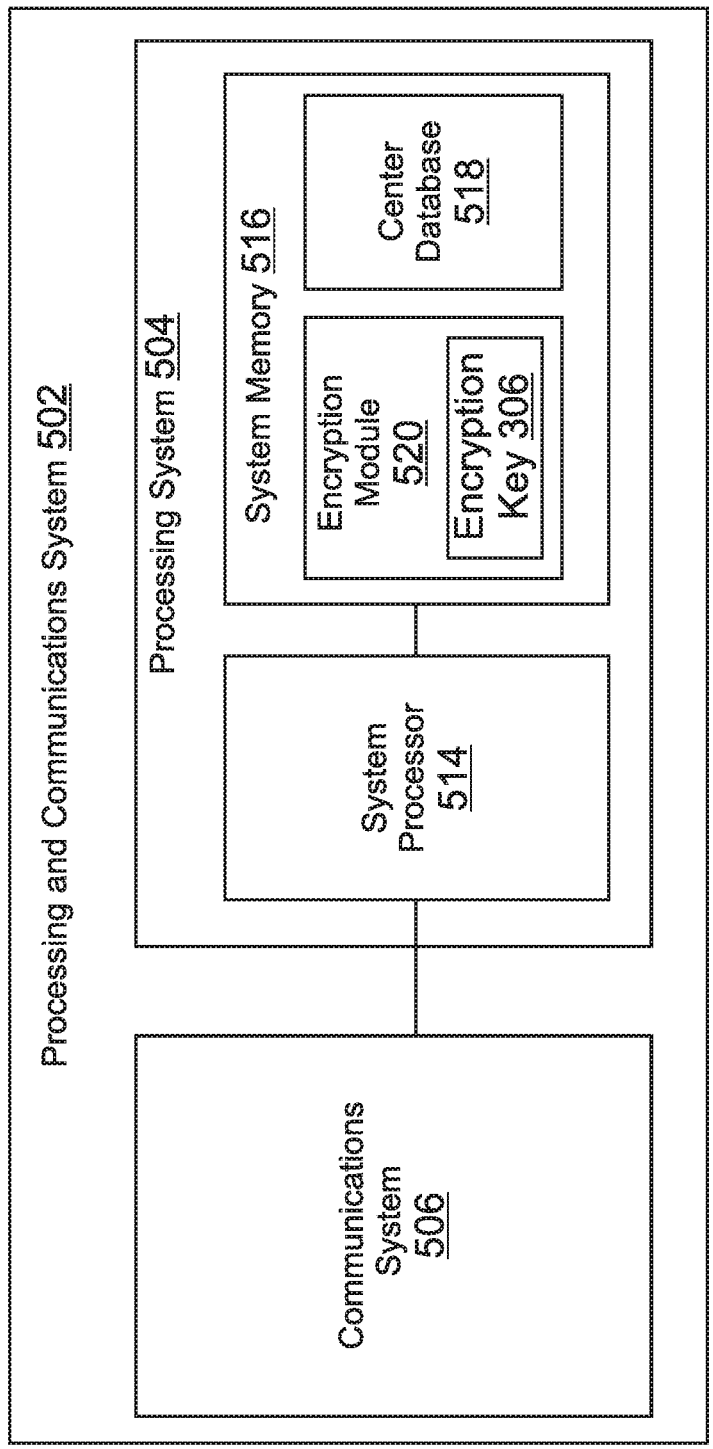
FIG. 5A illustrates a block diagram of an exemplary processing and communications system.

FIG. 5A illustrates one embodiment of a center processing and communications system 502. In one embodiment, the center processing and communications system 502 is located within the operations center 104. In another embodiment, the center processing and communications system 502 is located within the service provider center 106. In a further embodiment, the center processing and communications system 502 generates data, e.g. based upon user input, sensor data, or otherwise, that is communicated to the vehicle 101 to enable or disable one or more functions. In yet a further embodiment, the center processing and communications system 502 calculates the fees incurred for the functions enabled, and facilitates the invoicing of such fees, e.g. by the service provider center 106 or payment of such fees, e.g. by the operating center 104. In a further embodiment, the center processing and communications system 502 performs a combination, or a subset of the combination, of the operations described in the foregoing two embodiments.

The center processing and communications system 502 includes a processing system 504 coupled to a communications system 506. The communications system 506 facilitates communications over a communications link 108 amongst the vehicle 101, operations center 104, and the service provider center 106. In one embodiment, the communications system 506 transmits function enablement data 110 and receives confirmation data 112 respectively to and from, directly or indirectly, a vehicle 101. In another embodiment, the communications system 506 may include HF, VHF, satellite communication, cellular radio, Ethernet transceivers, and/or any other appropriate communication system.

In one embodiment, the processing system 504 is configured to authorize enablement of a function on the vehicle 101 by generating the confirmation data 112. In another embodiment, the processing system 504 includes a system processor 514 coupled to a memory 516. In another embodiment, the memory includes a center database 518. In yet another embodiment the center database 518 includes data about vehicles 101 identifying a serial number, e.g. the vehicle control system serial number 402, available functions (or functions which can be enabled on a vehicle 101), enabled functions and corresponding parameters such as time parameters as described above.

Figure 5B:
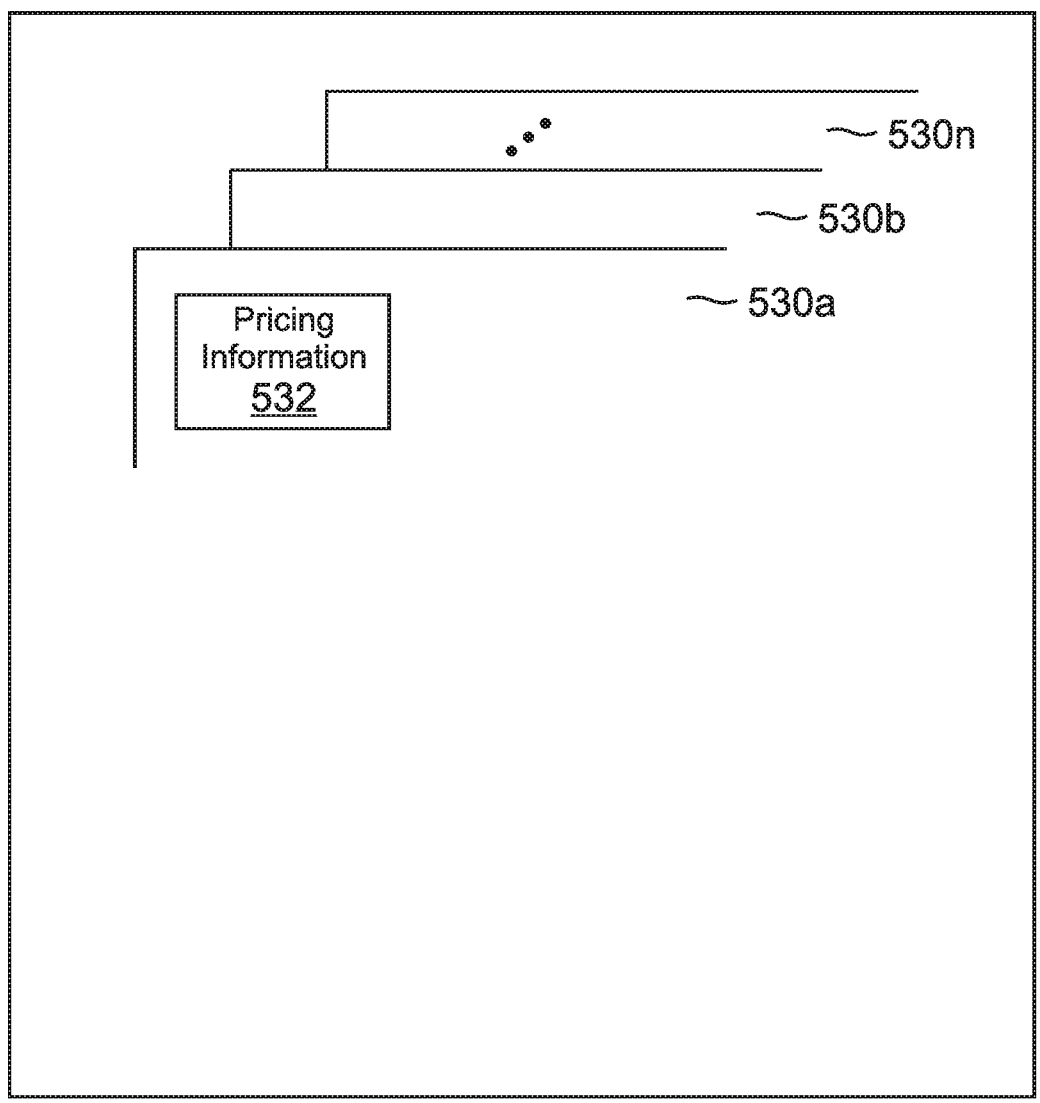
FIG. 5B illustrates an exemplary center database.

In one embodiment, as illustrated in FIG. 5B, the center database 518 is an aggregate of vehicle sub-databases 530*a, b, . . .* n corresponding to different vehicles 101. In another embodiment, the center database 518 data structure for each vehicle sub-database is the same as or similar to the data structure illustrated in FIG. 4. However, the center database 518, and the vehicle sub-databases 530 may have additional fields. In a further embodiment, if functions are being provided on a cafeteria style subscription plan, the sub-databases of the center database 518 may include field (s) corresponding to pricing information 532 for each function of a vehicle 101 which may be remotely enabled. Thus, in yet another embodiment, the processing system 504 can determine the cost of using any enabled function based upon the pricing information 532 and confirmation data 112.

Returning to FIG. 5A, in one embodiment, the center processing and communications system 502 includes an encryption module 520. The encryption module 520 is used to encrypt data transmitted from the center processing and communications system 502 to the vehicle 101, or to another center processing and communications system 502. In another embodiment, the encryption module 520 includes the encryption key 306. In a further embodiment, the encryption module 520 can be implemented in software, hardware, or a combination thereof.

In another embodiment, as illustrated in FIG. 5, the encryption module 520 is stored in the system memory 516. In another embodiment, the encryption module 520 can be located in the system processor 514, elsewhere in the processing system 504, or in the center processing and communications system 502 and coupled to the processing system 504. In yet a further embodiment, the center database 518 may be encrypted, e.g. using the same encryption key 306 as used in the encryption module 520. In another embodiment, the center database 518 may reside in the encryption module 520.

Figure 6:
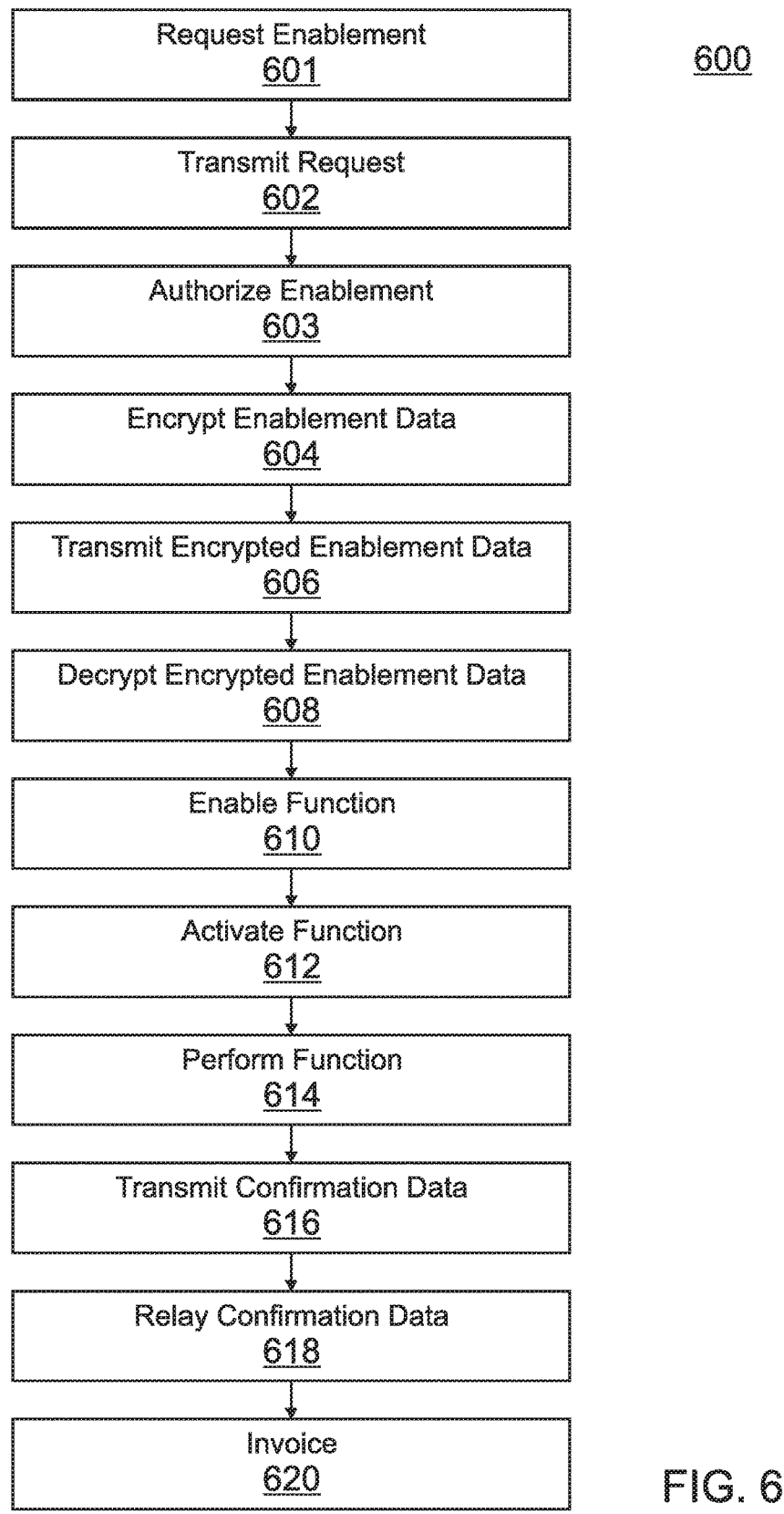
FIG. 6 is an exemplary flow diagram of a method of the operation of a communications network.

Exemplary operation of the communications network 100 will now be described. FIG. 6 illustrates one embodiment of a method 600 for the communications network 100 to enable functions on an aircraft. For pedagogical purposes, FIG. 6 is described in terms of remotely enabling functions in an aircraft (more generally illustrated above as a vehicle 101). However, it is understood that the teachings of FIG. 6 are applicable to other embodiments of communications with other types of vehicles 101. Thus, a pilot would more generically be an operator of a vehicle 101.

To the extent that the embodiment of method 600 shown in FIG. 6 is described herein as being implemented in the systems shown in FIGS. 1 through 5B, it is to be understood that other embodiments can be implemented in other ways. The blocks of the flow diagrams have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 601, in one embodiment, the aircraft, e.g. the pilot or vehicle processing system 210, requests enablement of a function. In other embodiments, the operations center 104, service provider center 106, or others entities or parties can request function enablement.

In one embodiment, in block 602, the enablement request is transmitted from the aircraft, through a communications link 108, to the operations center 104 and/or service provider center 106.

In block 603, enablement of a function on the aircraft is authorized by either the operations center 104, such as an airlines operations center, or the service provider center 106. In one embodiment, authorization is based upon a request to enable the function, e.g. received from the aircraft.

In block 604, the method 600 encrypts the function enablement data 110. In one embodiment, the operations center 104 or the service provider center 106 encrypts data, e.g. using the encryption module 520. In a further embodiment, the function enablement data 110, e.g. generated by the processing system 504, includes the unlocking key 406 for the corresponding function to be unlocked. In another embodiment, the unlocking key 406 is created by encrypting the vehicle control system serial number 402 and other data, e.g. the corresponding function ID 404, in the encryption module 520. In another embodiment, such encryption is performed using the encryption key 306; however other encryption keys may be used.

In block 606, the encrypted function enablement data is transmitted over a communications link 108, respectively from the operations center 104 or the service provider center 106, to the aircraft, e.g. to the vehicle communications system 220 which conveys it to the vehicle control system 204.

Then, in block 608, the received encrypted function enablement data is decrypted, e.g. by the vehicle processing system 210 or its decryption module 222. In one embodiment, the decryption is performed using the encryption key 306 and the vehicle control system serial number 402. In a further embodiment, the decrypted function enablement data specifies a function 404, an unlocking key 406, and other parameters, e.g. the time parameter 408.

In block 608, the decrypted function enablement data is analyzed, e.g. by the vehicle control system 204. In one embodiment, the vehicle processing system 210, e.g. the vehicle processor 302, compares the unlocking key 406 provided in the decrypted function enablement data with the corresponding unlocking key 406 for the same function 404 in the vehicle database 212.

In block 610, if the two unlocking keys are identical, the vehicle processing system 210, e.g. the vehicle processor 302, enables the function 404 (enable function) by correspondingly programming the Enable sub-field, and any other relevant sub-fields, e.g. the Time sub-field 408. In one embodiment, setting the Enable sub-field to enable or on turns on the corresponding function. Enablement permits the function 404 to be activated, but may or may not activate the function.

In block 612, upon function enablement, the function 404 is activated either automatically or manually. The function 404 may be activated manually, e.g. by the pilot, or automatically by the vehicle processing system 210.

In block 614, the function is performed, or used, e.g. by the pilot, or automatically by the vehicle processing system 210. In one embodiment, the period of time of enablement, activation and/or use of the function is recorded, e.g. in the vehicle database 212 in a separate sub-field for the corresponding function.

In block 616, the aircraft, e.g. the vehicle processing system 210 and the vehicle communications system 220, transmit confirmation data 112, through communication link(s) 108 to the operations center 104 and/or service provider center 106, confirming enablement, activation, and/or use of the enabled function. In one embodiment, such confirmation data 112 includes the identity each function that was enabled, activated and/or used, and the time period the corresponding function was respectively enabled, activated and/or used.

In one embodiment, in block 618, if only the operations center 104 received the confirmation data 112, then the operations center 104 transmits, or relays, the confirmation data 112, or a portion thereof, to the service provider center 106.

In one embodiment, in block 620, the service provider center 106 invoices to the aircraft operator, e.g. to the operations center 104, for the charges based on the functions 404 enabled, activated and/or used, and the corresponding time the functions were respectively enabled, activated and/or used. In another embodiment, the invoicing can be undertaken electronically, i.e. through e-billing.

EXAMPLE EMBODIMENTS

Example 1 includes a vehicle, comprising a vehicle control system; at least one vehicle control coupled to the vehicle control system; a vehicle communications system coupled to the vehicle control system; wherein the vehicle control system is configured to enable one or more vehicle functions upon receipt of a function enablement key provided through the vehicle communications system from an operations center; and wherein the vehicle control system is configured to transmit confirmation data from the vehicle to the operations center.

Example 2 includes the vehicle of Example 1, wherein the vehicle is an aircraft.

Example 3 includes the vehicle of Example 1, wherein the vehicle control system comprises a vehicle processing system comprising a vehicle database; an I/O coupled to the vehicle processing system; at least one sensor coupled to the vehicle processing system; and wherein the vehicle processing system is configured to modify the vehicle database in accordance with the function enablement key to enable the one or more functions.

Example 4 includes the vehicle of Example 3, wherein the function enablement key includes one or more unlocking keys; and wherein the vehicle processing system is further configured to enable the one or more functions with the one or more corresponding unlocking keys.

Example 5 includes the vehicle of Example 3, wherein the vehicle processing system comprises a vehicle processor; a vehicle memory coupled to the vehicle processor; and wherein the vehicle database resides in the vehicle memory.

Example 6 includes the vehicle of Example 1, wherein the vehicle control system is configured to transmit confirmation data from the vehicle to the operations center further comprises the vehicle control system is configured to transmit confirmation data from the vehicle to the operations center to permit the operations center to facilitate payment for the one or more enabled vehicle functions.

Example 7 includes a processing and communications system, comprising: a communications system configured to receive confirmation data and transmit function enablement data respectively from and to, directly or indirectly, a vehicle; and a processing system, coupled to the communications system, configured to authorize enablement of a function on the vehicle by generating the function enablement data.

Example 8 includes the processing and communications system of Example 7, wherein the processing system comprises a system processor; a system memory, coupled to the system processor, comprising a center database that identifies functions which can be enabled on the vehicle.

Example 9 includes the processing and communications system of Example 8, wherein the system memory further comprises an encryption module including an encryption key.

Example 10 includes the processing and communications system of Example 7, wherein the vehicle is an aircraft.

Example 11 includes the processing and communications system of Example 7, wherein the function enablement data includes an unlocking key.

Example 12 includes the processing and communications system of Example 8, wherein the center database includes pricing information for functions of the vehicle which may be enabled.

Example 13 includes the processing and communications system of Example 12, wherein the processing system is configured to use the pricing information and confirmation data to determine the cost of using a function.

Example 14 includes a method, comprising requesting enablement of a function in a vehicle; transmitting enablement data through a communications link to the vehicle; and enabling the function in the vehicle based upon the enablement data.

Example 15 includes the method of Example 14, wherein requesting enablement of a function in the vehicle further comprises requesting enablement of a function in an aircraft; wherein transmitting enablement data through the communications link to the vehicle further comprises transmitting enablement data through the communications link to the aircraft; and wherein enabling the function in the vehicle based on the enablement data further comprises enabling the function in the aircraft based on the enablement data.

Example 16 includes the method of claim 14, further compromising encrypting enablement data; and wherein transmitting enablement data through a communications link to the vehicle comprises transmitting encrypted data through a communications link to the vehicle.

Example 17 includes the method of Example 16, further comprising decrypting received encrypted data.

Example 18 includes the method of Example 14, further comprising: activating the enabled function; and performing the activated function.

Example 19 includes the method of Example 14, further comprising transmitting confirmation data from the vehicle to an operations center.

Example 20 includes the method of Example 14 further comprising invoicing the vehicle operator for the enabled function.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for remotely enabling functions of a vehicle to be selectively activated during operation of the vehicle, comprising:
    a vehicle communications system onboard the vehicle, the vehicle communications system configured to communicate with a remote operations center; and
    a vehicle control system coupled to the vehicle communications system for providing control, monitoring, and processing functions of the vehicle that can be enabled to be selectively activated during operation of the vehicle, the vehicle control system configured to:
        transmit, through the vehicle communications system, a request for enablement of one or more control, monitoring, and processing functions of the vehicle;
        receive, through the vehicle communications system, a function enablement key from the remote operations center in response to the request;
        based on the received function enablement key, enable one or more of the requested control, monitoring, and processing functions by unlocking the one or more control, monitoring, and processing functions to permit the enabled one or more control, monitoring, and processing functions to be selectively activated during operation of the vehicle; and
        transmit, through the vehicle communications system, confirmation data from the vehicle to the remote operations center, the confirmation data confirming enablement of the one or more control, monitoring, and processing functions.

2. The system of claim 1, wherein the vehicle is an aircraft.

3. The system of claim 1, wherein the vehicle control system comprises:
    a vehicle processing system comprising a vehicle database;
    an I/O coupled to the vehicle processing system;
    at least one sensor coupled to the vehicle processing system; and
    wherein the vehicle processing system is configured to modify the vehicle database in accordance with the function enablement key to enable the one or more vehicle functions.

4. The system of claim 3, wherein the function enablement key includes one or more unlocking keys; and
    wherein the vehicle processing system is further configured to enable the one or more control, monitoring, and processing functions with the one or more corresponding unlocking keys.

5. The system of claim 3, wherein the vehicle processing system comprises:
    a vehicle processor;
    a vehicle memory coupled to the vehicle processor; and
    wherein the vehicle database resides in the vehicle memory.

6. The system of claim 1, wherein the vehicle control system is configured to transmit the confirmation data from the vehicle to the remote operations center to permit the remote operations center to facilitate payment for the enabled one or more control, monitoring, and processing functions.

7. A processing and communications system for remotely enabling functions of a vehicle to be selectively activated during operation of the vehicle, comprising:
    a communications system located at a remote operations center, the communications system configured to communicate with a vehicle; and
    a processing system coupled to the communications system for authorizing enablement of one or more control, monitoring, and processing functions of the vehicle, the processing system configured to:
        receive a request for enablement of one or more of the control, monitoring, and processing functions to be selectively activated during operation of the vehicle;
        generate a function enablement key based on the requested enablement of the one or more control, monitoring, and processing functions; and
        transmit, through the communications system, the function enablement key to the vehicle to enable the one or more control, monitoring, and processing functions by unlocking the one or more control, monitoring, and processing functions to permit the enabled one or more control, monitoring, and processing functions to be selectively activated during operation of the vehicle; and
        receive, through the communications system, confirmation data from the vehicle, the confirmation data confirming enablement of the one or more control, monitoring, and processing functions.

8. The processing and communications system of claim 7, wherein the processing system comprises:
    a system processor; and
    a system memory, coupled to the system processor, comprising a center database that identifies the control, monitoring, and processing functions which can be enabled on the vehicle.

9. The processing and communications system of claim 8, wherein the system memory further comprises an encryption module including an encryption key for encrypting the function enablement key.

10. The processing and communications system of claim 7, wherein the vehicle is an aircraft.

11. The processing and communications system of claim 7, wherein the function enablement key includes an unlocking key.

12. The processing and communications system of claim 8, wherein the center database includes pricing information for the control, monitoring, and processing functions of the vehicle which may be enabled.

13. The processing and communications system of claim 12, wherein the processing system is further configured to use the pricing information and confirmation data to determine the cost of using each control, monitoring, and processing function.

14. A method for remotely enabling functions of a vehicle to be selectively activated during operation of the vehicle, comprising:
   transmitting, by a vehicle control system onboard the vehicle, a request for enablement of one or more control, monitoring, and processing functions of the vehicle;
   receiving, by the vehicle control system, a function enablement key from a remote operations center in response to the request; and
   based on the received function enablement key, enabling, by the vehicle control system, the requested one or more control, monitoring, and processing functions by unlocking the one or more control, monitoring, and processing functions to permit the one or more enabled control, monitoring, and processing functions to be selectively activated during operation of the vehicle.

15. The method of claim 14, wherein the vehicle is an aircraft.

16. The method of claim 14, wherein the function enablement key is encrypted.

17. The method of claim 16, further comprising decrypting the received encrypted function enablement key.

18. The method of claim 14, further comprising:
   activating, by the vehicle control system, the one or more enabled control, monitoring, and processing functions; and
   performing, by the vehicle control system, the one or more activated control monitoring, and processing functions.

19. The method of claim 14, further comprising transmitting, by the vehicle control system, confirmation data from the vehicle to the remote operations center, the confirmation data confirming enablement of the one or more control, monitoring, and processing functions.

20. The method of claim 14, further compromising receiving, by the vehicle control system, an invoice for invoicing an operator of the vehicle for the one or more enabled control, monitoring, and processing functions.

* * * * *